Feb. 1, 1955  W. W. GOTTSCHALK  2,701,034
BRAKING DEVICE
Original Filed June 29, 1948
Fig. I
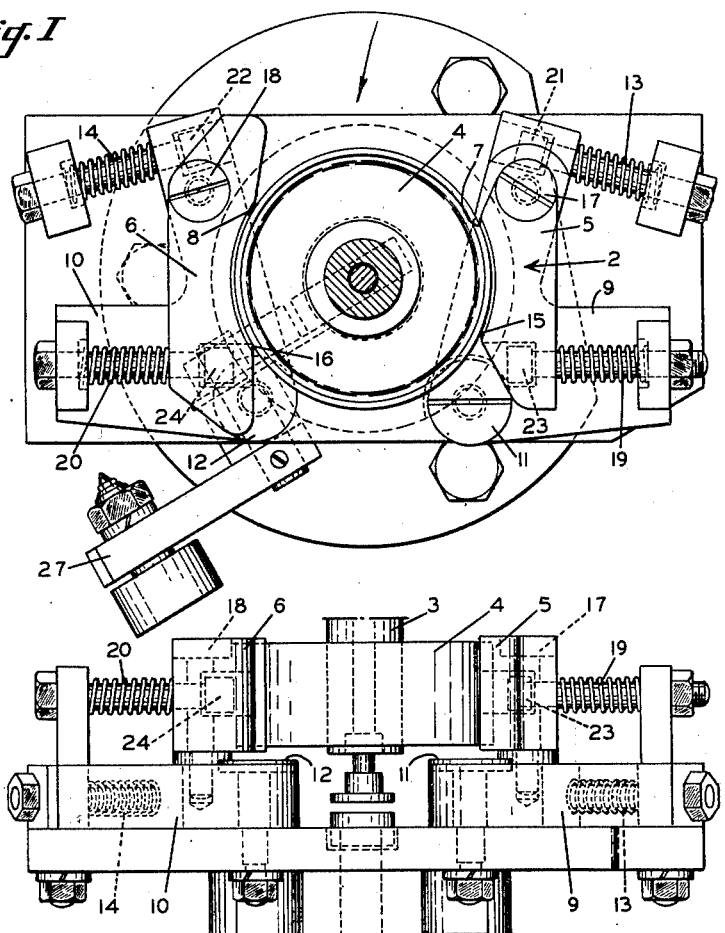
Fig. II
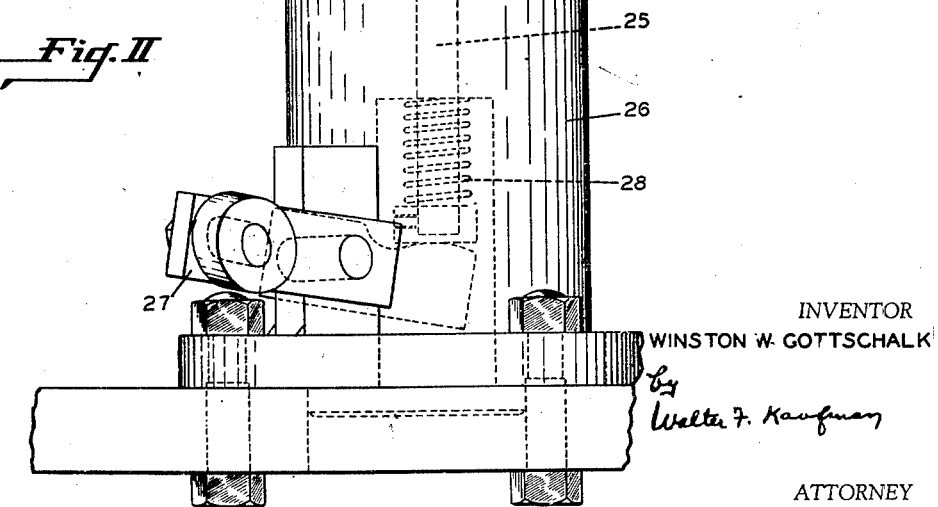
INVENTOR
WINSTON W. GOTTSCHALK
by
Walter F. Kaufman
ATTORNEY

United States Patent Office 2,701,034
Patented Feb. 1, 1955

2,701,034

BRAKING DEVICE

Winston W. Gottschalk, Lancaster, Pa., assignor to Armstrong Cork Company, Lancaster, Pa., a corporation of Pennsylvania Original application June 29, 1948, Serial No. 35,932. Divided and this application July 2, 1951, Serial No. 234,850

3 Claims. (Cl. 188—84)

This invention relates to a braking device, and more particularly to a self-actuating braking device for quickly halting rapidly rotating spindles on manufacturing equipment.

In the past, it has been common practice to employ braking devices which are operated through a suitable linkage from an electric switch or a mechanical tripping device of some sort. These devices are satisfactory in most instances, but in many instances it is necessary to halt rapidly rotating objects quickly and the linkage type braking mechanism is not satisfactory due to the delay caused by the time cycle required for the linkage mechanism to operate.

An example of the type of device which requires quick braking action is the device illustrated and described in my copending application Serial No. 35,932, filed June 29, 1948, entitled "Trimming Device," of which this application is a division.

In the device above referred to, a series of rapidly rotating spindles is sequentially revolved about a central axis through a plurality of processing stations. Each spindle carries a workpiece, and it is necessary that the spindles be rotated during a portion of their path of travel and that they be halted for the ejection of the workpiece and for the insertion of a new workpiece. In this specific instance, the drum carrying the spindles may be rotated from 3 R. P. M. to 20 R. P. M. Since the drum carries six spindles when operating at its maximum speed of 20 R. P. M., it is necessary to stop 120 spindles per minute, or two per second. It will be obvious from this that braking mechanisms requiring hydraulic or mechanical linkage would not be suitable to accomplish the quick braking action required.

In order to provide a braking mechanism suitable for accomplishing this purpose, the self-actuated brake disclosed herein has been developed.

In order that my invention may be more readily understood, it will be described in connection with the accompanying drawing in which Figure 1 is a top plan view of the braking mechanism; and Figure 2 is a front elevational view of the braking mechanism.

Referring to the drawing, there is illustrated a self-actuating brake mechanism 2 suitable for halting the rotation of the rotating spindle 3, which is provided on its lower extremity with a pulley 4. The purpose of the pulley 4 is to engage a belt during a certain portion of travel of the spindle in its circular path. The pulley 4 engages the belt, which imparts rotation thereto, and the spindle is subsequently halted by the self-actuating brake mechanism engaging the pulley 4. In the operation of the braking mechanism, the spindle 3 with the pulley 4 moves into the brake in a counterclockwise direction, as shown by the arrow in Figure 1. The pulley 4 is engaged by two arcuate brake shoes 5 and 6, which are of a shape to conform to the circumference of the pulley 4. When moving into the brake shoes 5 and 6, the pulley 4 first engages the brake shoes at points 7 and 8 on the brake shoes 5 and 6, respectively.

Inasmuch as rotary motion of the carrier on which the spindle is mounted forces the pulley into the brake shoes, the brake shoes are permitted to separate by means of the construction of the brake. The shoes 5 and 6 are secured to rocker arms 9 and 10, respectively. The rocker arms 9 and 10 are pivotally attached to the frame of the machine by means of bolts 11 and 12. As the rocker arms 9 and 10 are pivoted around the bolts 11 and 12, springs 13 and 14 are compressed. As the pulley moves into the center of the brake, springs 13 and 14 move rocker arms 9 and 10 toward one another, carrying the brake shoes 5 and 6 with them. This spring action forces the brake shoes into engagement with the rotating pulley 4, and the frictional drag stops the pulley. As the pulley 4 moves out of the brake, it engages points 15 and 16 on the brake shoes 5 and 6. The brake shoes 5 and 6 are secured to the rocker arms 9 and 10 by means of pivot screws 17 and 18. As the brake shoes are forced apart at points 15 and 16, they pivot around points 17 and 18, and in so doing, compress springs 19 and 20, thereby allowing the pulley to move out of the brake. After the pulley is clear of the brake, springs 19 and 20 urge the brake shoes back to their original position and the brake is ready for the next succeeding pulley.

In order to prevent springs 13 and 14 from returning the rocker arms 9 and 10 too far, I have limited this action by counterboring the rocker arms 9 and 10 in such manner thtat the enlarged ends 21 and 22 of the bolts passing through and holding the springs 13 and 14 contact the shoulder of the counterbored portion. The brake shoes 5 and 6 are counterbored in a similar manner so that the enlarged heads 23 and 24 of the bolts holding the springs 19 and 20 will engage the shoulder of the counterbored section. These bolt heads 21, 22, 23, and 24 prevent the movable parts of the brake assembly from moving too far over the action of the springs.

In a brake of this type in which both ends of the brake shoe are spring urged and the pressure exerted on the brake shoe is substantially the same at both ends, a uniform pressure is exerted on the brake lining at all points along the arcuate surface of the brake. This causes uniform wear on the brake lining and exerts a pressure over a greater area of the rotating pulley, thereby gaining greater efficiency from the brake.

In many industrial machines it is necessary to stop a rotating spindle while it is positioned in one station for only a fraction of a second. It is, therefore, essential that the braking action be practically instantaneous, and many of the conventional hydraulic and mechanical linkage type brakes are impractical for accomplishing this purpose. In the device illustrated and described herein, the braking action is effective from the instant the pulley touches the brake shoes until it leaves the brakes shoes.

In machines of the type here under consideration it is often necessary or desirable to perform another operation at the same station at which the braking action is accomplished. In the particular device here under consideration, the workpiece is ejected at the same station at which the braking action is applied to the rotating spindle. This ejection operation is performed by the ejector mechanism shown generally at 25, which operates through the center of the brake support 26. This ejector is raised by means of the cam-operated lever 27 and is lowered to its inoperative position by means of the spring 28. This can be easily accomplished with a simple compact, self-contained, and self-actuated braking mechanism of the type herein disclosed which does not require any external connections to control the same.

Another advantage in braking devices of this type is the small amount of energy which is lost through movement of the braking elements occasioned by the short distances the braking elements must move to accomplish the braking action required.

Furthermore, the braking mechanism is easily disassembled and reassembled for repair and replacement of parts without the dismantling of any portion of the machine to which it is affixed.

I claim:

1. A braking device comprising a pair of brake shoes positioned to engage a rotating pulley traveling in a circular path, each of said brake shoes being pivotally attached to a rocker arm which is in turn pivotally attached to a rigid support, the arrangement of said brake shoes and said rocker arms being such that the brake shoes are forced away from one another by a pulley entering the device to be positioned between the brake shoes, a spring connecting each rocker arm to the rigid support at the end of the rocker arm opposite the pivotal attachment to the support, said spring being compressed when the rocker arms are forced apart and serving to return the rocker arms to their original position when the pulley is properly positioned between the shoes, the end of each brake shoe opposite its pivotal attachment to the rocker arm being connected to the rocker arm by means of a spring, said spring being compressed when the shoes are forced apart as the pulley is leaving the brake assembly and serving to return the brake shoes to their original position, and means to prevent the springs acting on the rocker arms and the springs acting on the brake shoes from closing the brake an excessive amount.

2. A braking device comprising a pair of spaced brake shoes positioned to engage a rotating pulley traveling in a predetermined path between said brake shoes, each of said brake shoes being pivotally attached at one end to a rocker arm which is in turn pivotally attached at one end to a rigid support, the arrangement of said brake shoes and said rocker arms being such that the brake shoes are forced away from one another by said pulley moving into position between the brake shoes, resilient means connecting said rocker arm to the rigid support at the end of the rocker arm opposite the pivotal attachment to said support, said resilient means serving to return the rocker arm to its original position when the pulley is properly positioned between the brake shoes, the end of each brake shoe opposite its pivotal attachment to the rocker arm being connected to the rocker arm by resilient means capable of forcing the brake shoe into contact with the periphery of a rotating pulley, and means for preventing the resilient means from returning the brake shoes an excessive amount.

3. A braking device comprising a pair of spaced brake shoes to sequentially engage a plurality of rotating pulleys traveling in a predetermined path between said brake shoes, each of said brake shoes being pivotally attached at one end to a rocker arm which is in turn pivotally attached at one end to a rigid support, the engagement of said brake shoes with said rocker arms being such that the brake shoes are forced away from one another by said pulleys entering the device and leaving the device, resilient means connecting each rocker arm to the rigid support at the end of the rocker arm opposite the pivotal attachment to said support, and resilient means connecting said brake shoes to said rocker arms at the end opposite the pivotal attachment of the brake shoes to the rocker arms, both of said resilient means serving to urge said brake shoes into uniform engagement with the periphery of a pulley positioned between the shoes and to return the brake to closed position after one pulley has left and before the next one is received therein.

References Cited in the file of this patent

UNITED STATES PATENTS

| 1,315,874 | Smythe | Sept. 9, 1919 |
| 1,824,150 | Howe | Sept. 22, 1931 |
| 2,233,798 | Robins | Mar. 4, 1941 |